US012775476B2

(12) United States Patent
Kuang et al.

(10) Patent No.: US 12,775,476 B2
(45) Date of Patent: Oct. 27, 2026

(54) GRAPHICAL USER INTERFACE FOR GENERATIVE MODELS WITH STATE PRESERVATION

(71) Applicant: GOOGLE LLC, Mountain View, CA (US)

(72) Inventors: Cliff Kuang, San Francisco, CA (US); John Richter, Boulder, CO (US); Micah Lemonik, Great Neck, NY (US)

(73) Assignee: GOOGLE LLC, Mountain View, CA (US)

( * ) Notice: Subject to any disclaimer, the term of this patent is extended or adjusted under 35 U.S.C. 154(b) by 134 days.

(21) Appl. No.: 18/810,363

(22) Filed: Aug. 20, 2024

(65) Prior Publication Data

US 2025/0348333 A1 Nov. 13, 2025

Related U.S. Application Data

(60) Provisional application No. 63/646,373, filed on May 13, 2024.

(51) Int. Cl.
*G06F 9/451* (2018.01)

(52) U.S. Cl.
CPC .................................... *G06F 9/451* (2018.02)

(58) Field of Classification Search
None
See application file for complete search history.

(56) References Cited

U.S. PATENT DOCUMENTS

| | | | | |
|---|---|---|---|---|
| 2021/0192397 | A1* | 6/2021 | Rastogi | G06F 16/211 |
| 2024/0153297 | A1* | 5/2024 | Zhang | G06V 30/19147 |
| 2024/0256757 | A1* | 8/2024 | Manavoglu | G06F 40/134 |
| 2024/0296293 | A1* | 9/2024 | Tsun | G06F 40/35 |
| 2025/0131289 | A1* | 4/2025 | Larson | G06N 5/02 |
| 2025/0156463 | A1* | 5/2025 | Rosa | G06F 16/3344 |
| 2025/0178439 | A1* | 6/2025 | Gage | B60K 35/81 |

(Continued)

OTHER PUBLICATIONS

Brie, P. et al., "Evaluating a Large Language Model on Searching for GUI Layouts"; in Proceedings of the ACM on Human-Computer Interaction, vol. 7, No. EICS; 37 pages; dated Jun. 19, 2023.

(Continued)

*Primary Examiner* — Toan H Vu
(74) *Attorney, Agent, or Firm* — Gray Ice Higdon

(57) ABSTRACT

Implementations relate to graphical user interfaces (GUIs) for interacting with generative model(s). Processor(s) of a system can: receive user input associated with a user of a client device; process, using a generative model (GM), a GM input including the user input and a general schema prompt to generate a GM output; determine, based on the GM output, GUI elements and a specific schema prompt specific to the user input and based on the general schema prompt; cause the GUI elements to be rendered; store a specific schema that has been determined based on the GM output; receive additional user input; process, using the GM, an additional GM input including the additional user input and specific schema prompt to generate an additional GM output; determine, based on the additional GM output, updated GUI elements and an updated specific schema prompt; and cause the updated GUI elements to be rendered.

19 Claims, 7 Drawing Sheets

(56) References Cited

U.S. PATENT DOCUMENTS

| | | | | |
|---|---|---|---|---|
| 2025/0238638 | A1* | 7/2025 | Ouyang | G06F 40/51 |
| 2025/0342321 | A1* | 11/2025 | Shin | G06F 3/04842 |

OTHER PUBLICATIONS

Zhong, W. et al., "Improving Task Generalization via Unified Schema Prompt"; arXiv.org, Cornell University; arXiv:2208.03229; 15 pages; dated Aug. 5, 2022.

European Patent Office; International Search Report and Written Opinion issued in Application No. PCT/US2025/022978; 15 pages; dated Jun. 23, 2025.

* cited by examiner

GRAPHICAL USER INTERFACE FOR GENERATIVE MODELS WITH STATE PRESERVATION

BACKGROUND

Various generative models have been proposed that can be used to process natural language (NL) content and/or other input(s), to generate output that reflects generative content that is responsive to the input(s). For example, large language models (LLMs) and their multi-modal counterparts are powerful generative machine learning models that can be used to generate output from user input in order to perform a diverse set of tasks. LLMs are typically trained on enormous amounts of diverse data including data from, but not limited to, webpages, electronic books, software code, electronic news articles, and machine translation data. Accordingly, these LLMs leverage the underlying data on which they were trained in performing these various natural language processing (NLP) tasks. For instance, in performing a language generation task, these LLMs can process a natural language (NL) based input that is received from a client device, and generate a response that is responsive to the NL based input and that is to be rendered at the client device.

Typically, a user interacts with an LLM via a dialog sequence in a chat-style interface. However, this type of linear interface can be sub-optimal for carrying out many tasks or exploring topics. In particular, as the dialog progresses, previous dialog turns will disappear off-screen. A user will then have to scroll back through dialog sequence to view previous responses. A user may also want to refer back to a particular LLM response and, given the chat-style interface, it can be difficult for a user to find the particular response. Furthermore, where an LLM response includes multiple items or topics that the user may wish to subsequently explore or refine, the user may be able to explore or refine one or two of the items or topics using the LLM during a given session with the LLM, however, due to the somewhat transient nature of LLM state history, the user may find it difficult to return to one or more of the unexplored items or topics for exploration or refinement in a later LLM session. It is therefore beneficial to provide an improved system for users to interact with LLMs and generative models.

SUMMARY

Implementations described herein relate to graphical user interfaces (GUIs) for generative models (GMs). In particular, schema prompts may be used to guide a GM to output responses in a particular schema, that is, a structured format. From the output schema, elements of a GUI can be generated and rendered. The schema prompts can be dynamically adjusted based upon user interaction with systems disclosed herein, with the schema prompts iteratively updated to include schemas previously generated using the GM. Dynamically updating the schema prompts based on previous outputs of the GM, storing the updated schema prompts and utilizing the updated schema prompts to generate subsequent GM outputs may assist with the preservation of states between GM sessions.

Processor(s) of a system can: receive user input associated with a user of a client device; process, using a generative model, a generative model input to generate a generative model output, the generative model input including at least the user input and a general schema prompt; determine, based on the generative model output, GUI elements and a specific schema prompt that is specific to the user input and that is based on the general schema prompt; cause the GUI elements to be rendered at the client device; store a specific schema that has been determined based on the generative model output; receive additional user input associated with the user of the client device; process, using the generative model, an additional generative model input to generate an additional generative model output, the additional generative model input including at least the additional user input and the specific schema prompt; determine, based on the additional generative model output, updated GUI elements and an updated specific schema prompt that is specific to the user input and that is based on the specific schema prompt; cause the updated GUI elements to be rendered at the client device; and update the specific schema that is stored.

Users typically interact with GMs such as LLMs using a dialog sequence in a chat-style user interface. However, such interfaces can be sub-optimal when attempting to carry out tasks that can have multiple steps, options or dependencies. For example, an LLM can generate an initial set of items in response to a first user query. A user may then choose to input further queries to the LLM regarding one of the items generated by the LLM in response to the first user query, to further explore that item. However, continued use of the LLM may result in the initial LLM response with the list of items being displaced off-screen. The user will then have to scroll back through the dialog sequence to find the initial list of items or the user may have to prompt the LLM to re-generate the list of items. Furthermore, LLMs typically have a limited context window and thus, re-prompting to obtain previously generated information can cause the LLM to forget earlier information, as well as unnecessarily incur computational costs in handling such queries.

The techniques described herein provide a graphical user interface for generative models whereby a first set of items included in a schema output by a generative model are displayed at a user device using a first set of GUI elements. A general schema prompt is processed together with user input by the generative model (GM) to guide the GM to generate the first set of items as part of the schema. The schema output using the GM may then be utilized to generate a new, specific schema prompt that is specific to the user input. When an additional user input is provided by a user to further refine or explore the output of the GM, the specific schema prompt may be processed together with the additional user input to guide the GM to provide an output based on the specific schema output at the previous iteration.

The system can reduce the amount of user interaction needed with the device as the GUI can provide an improved organizational layout for viewing generative model output compared to a traditional linear chat-style interface where the dialog can quickly disappear off-screen. Furthermore, state preservation of previous responses output by the GM can also reduce the amount of user interaction needed with the device as the user may no longer have to re-prompt the generative model unnecessarily, saving computational resources. The techniques described herein therefore provide overall improved user interfaces for generative models.

In some implementations, the receipt of additional input (also referred to herein as additional data or additional information) from the user can be facilitated (e.g., in addition to an initial input prompt). For instance, the additional input can include NL based input provided via a natural language text entry field rendered on a display of the user's device (e.g., using a virtual keyboard, a speech input, etc.). The additional input can include additional information to be taken into account when responding to the initial input prompt. For instance, the additional information can be considered when refining the output of the GM such that it better meets the requirements of the user, and/or when generating or updating GUI elements corresponding to items generated by the GM that are responsive to the initial input prompt. The additional input can include, for instance, additional context the user wishes to add, user preferences, or other constraints. As an illustrative example, assuming the initial input prompt is indicative of a task to be performed by a robot, the additional input can, for instance, relate to one or more parameters or constraints of the task (e.g., a time for the task to be completed, a particular robot to be used, a particular target object to be interacted with by the robot, a particular route for the robot to use when performing the task, etc.) which may not have been represented in the initial output generated using the GM. For instance, assuming the task is a request for the robot to retrieve a beverage from a kitchen, the additional information might include, for instance, the text "I would like a cold beverage". Responsively, when the final response is generated, based on this additional information, it can be determined to retrieve a beverage from a refrigerator in the kitchen. If, subsequently, the user provided more additional information including the text, "The children are playing in the living room", when the final response is generated, based on this additional information, it can also be determined that the robot should follow a path avoiding the living room. Additionally, or alternatively, the UI elements generated based the output of the GM can be updated (e.g., using the LLM or other GM) based on this additional information. Although the additional input is generally described as being received from a user, it should be understood that the additional input can be retrieved from other sources. For instance, the additional input can be retrieved from other applications with which the user has granted permission to share contextual information (e.g., such as calendar entries, weather forecast information, messaging content, etc.).

In some implementations, a GM can include at least hundreds of millions of parameters. In some of those implementations, the GM includes at least billions of parameters, such as one hundred billion or more parameters. In some additional or alternative implementations, a GM is a sequence-to-sequence model, is Transformer-based, and/or can include an encoder and/or a decoder. Non-limiting examples of GMs include Bard, Gemini, GPT, PaLM, LaMDA etc. It should be noted that the GMs described herein are not intended to be limiting.

The above description is provided as an overview of some implementations of the present disclosure. Further description of those implementations, and other implementations, are described in more detail below.

DETAILED DESCRIPTION OF THE DRAWINGS

Figure 1:
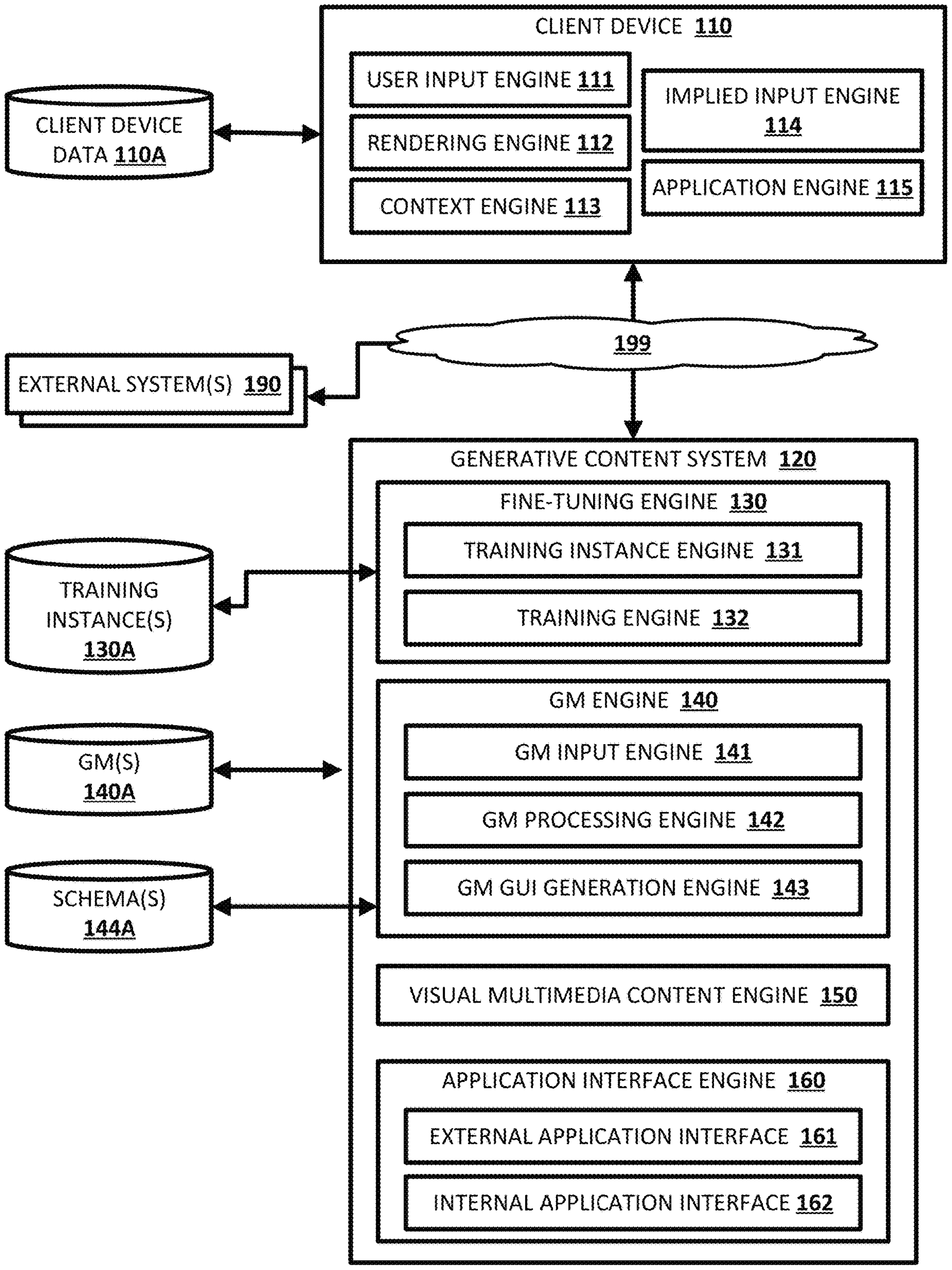
FIG. 1 depicts a block diagram of an example environment that demonstrates various aspects of the present disclosure, and in which some implementations disclosed herein can be implemented.

Turning now to FIG. 1, a block diagram of an example environment that demonstrates various aspects of the present disclosure, and in which implementations disclosed herein can be implemented is depicted. The example environment includes a client device 110 and a generative content system 120. In some implementations, all or aspects of the generative content system 120 can be implemented locally at the client device 110. In additional or alternative implementations, all or aspects of the generative content system 120 can be implemented remotely from the client device 110 as depicted in FIG. 1 (e.g., at remote server(s)). In those implementations, the client device 110 and the generative content system 120 can be communicatively coupled with each other via one or more networks 199, such as one or more wired or wireless local area networks ("LANs," including Wi-Fi, mesh networks, Bluetooth, near-field communication, etc.) or wide area networks ("WANs", including the Internet).

The client device 110 can be, for example, one or more of: a desktop computer, a laptop computer, a tablet, a mobile phone, a computing device of a vehicle (e.g., an in-vehicle communications system, an in-vehicle entertainment system, an in-vehicle navigation system), a standalone interactive speaker (optionally having a display), a smart appliance such as a smart television, and/or a wearable apparatus of the user that includes a computing device (e.g., a watch of the user having a computing device, glasses of the user having a computing device, a virtual or augmented reality computing device). Additional and/or alternative client devices may be provided.

The client device 110 can execute one or more software applications, via application engine 115, through which uni-modal or multi-modal input can be submitted and/or multi-modal responses and/or other responses (e.g., uni-modal responses) that are responsive to the uni-modal or multi-modal input can be rendered (e.g., audibly and/or visually). The application engine 115 can execute one or more software applications that are separate from an operating system of the client device 110 (e.g., one installed "on top" of the operating system)—or can alternatively be implemented directly by the operating system of the client device 110. For example, the application engine 115 can execute a web browser or automated assistant installed on top of the operating system of the client device 110. As another example, the application engine 115 can execute a web browser software application or automated assistant software application that is integrated as part of the operating system of the client device 110. The application engine 115 (and the one or more software applications executed by the application engine 115) can interact with or otherwise provide access to (e.g., as a front-end) the generative content system 120.

In various implementations, the client device 110 can include a user input engine 111 that is configured to detect user input provided by a user of the client device 110 using one or more user interface input devices. For example, the client device 110 can be equipped with one or more microphones that capture audio data, such as audio data corresponding to spoken utterances of the user or other sounds in an environment of the client device 110. Additionally, or alternatively, the client device 110 can be equipped with one or more vision components that are configured to capture vision data corresponding to images and/or movements (e.g., gestures) detected in a field of view of one or more of the vision components. Additionally, or alternatively, the client device 110 can be equipped with one or more touch sensitive components (e.g., a keyboard and mouse, a stylus, a touch screen, a touch panel, one or more hardware buttons, etc.) that are configured to capture signal(s) corresponding to typed and/or touch inputs directed to the client device 110.

Some instances of an input prompt described herein can be provided by a user of the client device 110 and detected via user input engine 111. For example, the input prompt can be typed via a physical or virtual keyboard, be a suggestion displayed by the client device 110 that is selected via a touch screen or a mouse of the client device 110, be speech that is detected via microphone(s) of the client device 110 (and optionally directed to an automated assistant executing at least in part at the client device 110). An image or video input can be based on vision data captured by vision component(s) of the client device 110, or be obtained from an application such as a web browser or photograph collection.

In various implementations, the client device 110 can include a rendering engine 112 that is configured to render content (e.g., uni-modal responses, multi-modal responses, an indication of source(s) associated with portion(s) of the uni-modal and/or multi-modal responses, and/or other content) for audible and/or visual presentation to a user of the client device 110 using one or more user interface output devices. For example, the client device 110 can be equipped with one or more speakers that enable audible content to be provided for audible presentation to the user via the client device 110. Additionally, or alternatively, the client device 110 can be equipped with a display or projector that enables textual content or other visual content (e.g., image(s), video (s), etc.) to be provided for visual presentation to the user via the client device 110.

In various implementations, the client device 110 can include a context engine 113 that is configured to determine a client device context (e.g., current or recent context) of the client device 110 and/or a user context of a user of the client device 110 (or an active user of the client device 110 when the client device 110 is associated with multiple users). In some of those implementations, the context engine 113 can determine a context based on data stored in client device data database 110A. The data stored in the client device data database 110A can include, for example, user interaction data that characterizes current or recent interaction(s) of the client device 110 and/or a user of the client device 110, location data that characterizes a current or recent location (s) of the client device 110 and/or a geographical region associated with a user of the client device 110, user attribute data that characterizes one or more attributes of a user of the client device 110, user preference data that characterizes one or more preferences of a user of the client device 110, user profile data that characterizes a profile of a user of the client device 110, and/or any other data accessible to the context engine 113 via the client device data database 110A or otherwise.

For example, the context engine 113 can determine a current context based on a current state of a dialog session (e.g., considering one or more recent inputs provided by a user during the dialog session), profile data, and/or a current location of the client device 110. For instance, the context engine 113 can determine a current context of "visitor looking for upcoming events in Epsom, England" based on a recently issued query, profile data, and an anticipated future location of the client device 110 (e.g., based on recently booked hotel accommodations). As another example, the context engine 113 can determine a current context based on which software application is active in the foreground of the client device 110, a current or recent state of the active software application, and/or content currently or recently rendered by the active software application. A context determined by the context engine 113 can be utilized, for example, in supplementing or rewriting NL based input that is formulated based on user input, in generating an implied NL based input (e.g., an implied query or prompt formulated independent of any explicit NL based input provided by a user of the client device 110), and/or in determining to submit an implied NL based input and/or to render result(s) (e.g., a response) for an implied NL based input.

In various implementations, the client device 110 can include an implied input engine 114 that is configured to: generate an implied NL based input independent of any user explicit NL based input provided by a user of the client device 110; submit an implied NL based input, optionally independent of any user explicit NL based input that requests submission of the implied NL based input; and/or cause rendering of search result(s) or a response for the implied NL based input, optionally independent of any explicit NL based input that requests rendering of the search result(s) or the response. For example, the implied input engine 114 can use one or more past or current contexts, from the context engine 113, in generating an implied NL based input, determining to submit the implied NL based input, and/or in determining to cause rendering of search result(s) or a response that is responsive to the implied NL based input. For instance, the implied input engine 114 can automatically generate and automatically submit an implied query or implied prompt based on the one or more past or current contexts. Further, the implied input engine 114 can automatically push the search result(s) or the response that is generated responsive to the implied query or implied prompt to cause them to be automatically rendered or can automatically push a notification of the search result(s) or the response, such as a selectable notification that, when selected, causes rendering of the search result(s) or the response. Additionally, or alternatively, the implied input engine 114 can submit respective implied NL based input at regular or non-regular intervals, and cause respective search result(s) or respective responses to be automatically provided (or a notification thereof automatically provided). For instance, the implied NL based input can be "art gallery exhibitions" based on the one or more past or current contexts indicating a user's general interest in art, the implied NL based input or a variation thereof periodically submitted, and the respective search result(s) or the respective responses can be automatically provided (or a notification thereof automatically provided). It is noted that the respective search result(s) or the response can vary over time in view of, e.g., presence of new/fresh search result document(s) over time.

Further, the client device 110 and/or the generative content system 120 can include one or more memories for storage of data and/or software applications, one or more processors for accessing data and executing the software applications, and/or other components that facilitate communication over one or more of the networks 199. In some implementations, one or more of the software applications can be installed locally at the client device 110, whereas in other implementations one or more of the software applications can be hosted remotely (e.g., by one or more servers) and can be accessible by the client device 110 over one or more of the networks 199.

Although aspects of FIG. 1 are illustrated or described with respect to a single client device having a single user, it should be understood that is for the sake of example and is not meant to be limiting. For example, one or more additional client devices of a user and/or of additional user(s) can also implement the techniques described herein. For instance, the client device 110, the one or more additional client devices, and/or any other computing devices of a user can form an ecosystem of devices that can employ techniques described herein. These additional client devices and/or computing devices may be in communication with the client device 110 (e.g., over the network(s) 199). As another example, a given client device can be utilized by multiple users in a shared setting (e.g., a group of users, a household, a workplace, a hotel, etc.).

The generative content system 120 is illustrated in FIG. 1 as including a fine-tuning engine 130, a GM engine 140, a visual multimedia content engine 150, and an application interface engine 160. Some of these engines can be combined and/or omitted in various implementations. Further, these engines can include various sub-engines. For instance, the fine-tuning engine 130 is illustrated in FIG. 1 as including a training instance engine 131 and a training engine 132.

The training instance engine 131 can select training instances, for example, from training instance database 130A, for training a GM. In some implementations, the training instance engine 131 can also generate training instances.

The training engine 132 can train one or more GMs using the selected training instances. For example, the training engine 132 can fine-tune the parameters of one or more GMs stored in a GM database 140A to carry out a specific task, such as any of the methods disclosed herein.

Further, the GM engine 140 illustrated in FIG. 1 includes a GM input engine 141, a GM processing engine 142, and a GM GUI generation engine 143.

The GM input engine 141 can, in response to receiving a user input from the client device 110, carry out processing of the user input to generate GM input for processing by a GM or other engine/sub-engine. For example, the GM input engine 141 can determine a prompt for processing by a GM based upon the user input and a schema prompt, as described below.

Figure 2:
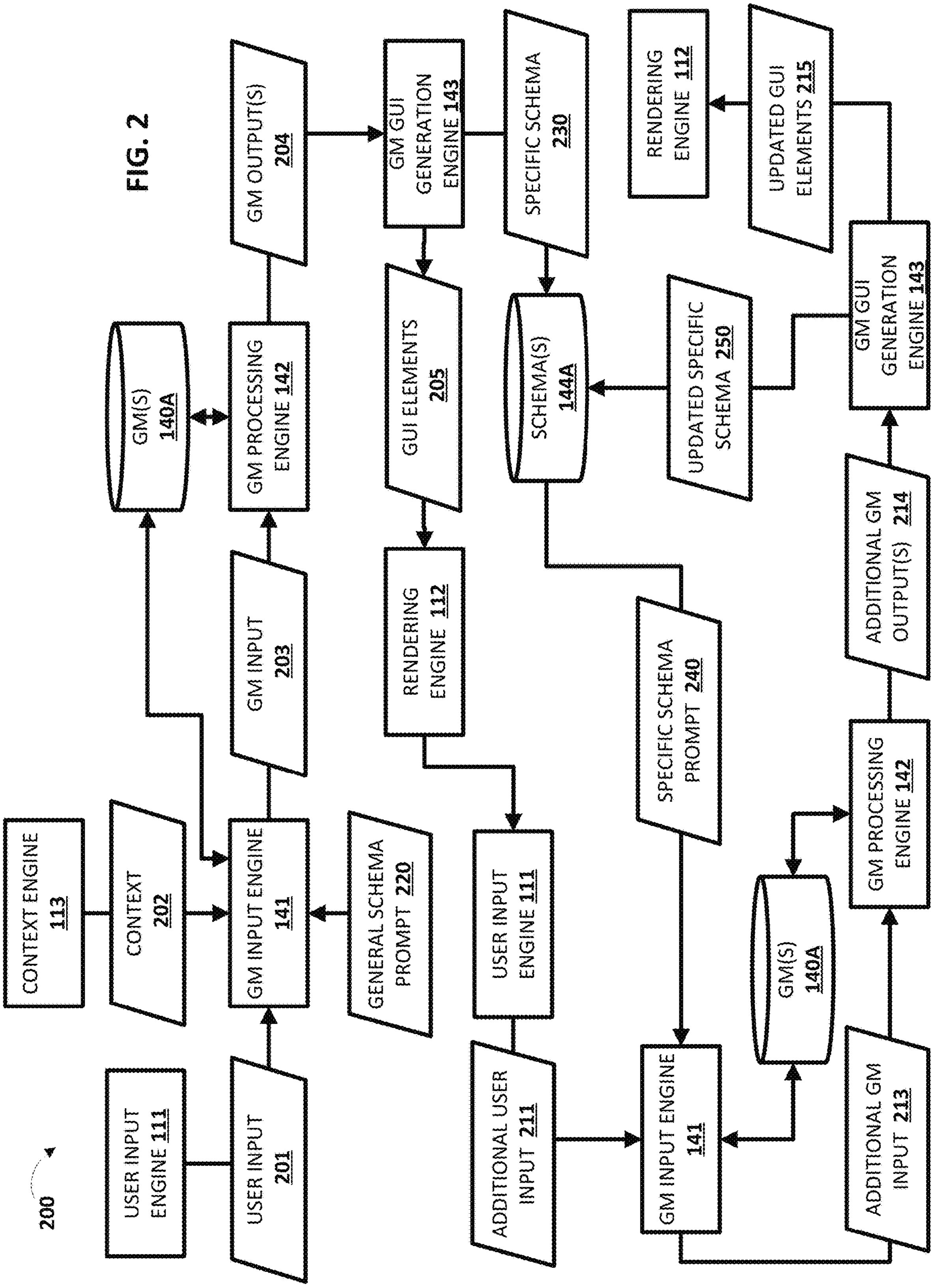
FIG. 2 depicts an example process flow of providing a GUI for generative models using various components from FIG. 1, in accordance with various implementations.

The GM processing engine 142 can, in response to receiving an input, determine which, if any, of multiple GMs to utilize in generating response(s) to render responsive to the input. The GM processing engine 142 can optionally utilize one or more classifiers and/or rules (not illustrated). The GM processing engine 142 can process the GM input that is generated by the GM input engine 141 using a selected GM to generate a response as a GM output. The response can be a multi-modal response, for example, including image, audio and/or NL text output, or a uni-modal response as determined by the GM. In various implementations, the GM processing engine 142 can be used as indicated in FIG. 2, and/or can perform all or aspects of blocks 454 and 464 of method 400 of FIG. 4.

The GM GUI generation engine 143 can determine an appropriate set of GUI elements with which the generated response can be visually rendered on the client device 110. In some implementations, the GM can select an appropriate GUI from a plurality of GUI templates and/or the GM can generate an appropriate arrangement of GUI elements for the visually rendering the response. The GM can also be used to generate the GUI elements themselves. In various implementations, the GM GUI generation engine 143 can be used as indicated in FIG. 2, and/or can perform all or aspects of blocks 456 and 466 of method 400 of FIG. 4.

In various implementations, the visual multimedia content engine 150 can determine visual multimedia content to be rendered along with, or as part of, the GUI elements. In some versions of those implementations, the visual multimedia content can be generative visual multimedia content (e.g., generative image(s), generative video(s), generative animation(s) or gif(s), etc.). In some implementations, the visual multimedia content engine 150 can determine the visual multimedia content based on the GM output(s). In other versions of those implementations, the visual multimedia content can be non-generative visual multimedia content (e.g., non-generative image(s), non-generative video(s), non-generative animation(s) or gif(s), etc.). In implementations where the visual multimedia content engine 150 determines non-generative visual multimedia content, the visual multimedia content engine 150 can obtain the non-generative visual multimedia content from one or more databases (e.g., an image/video album of the user of the client device 110, an image/video of the user of the client device 110 obtained via a call to one of the external system(s) 190, such as the Internet, etc.).

Further, the application interface engine 160 illustrated in FIG. 1 includes an external application interface 161 and an internal application interface 162. The external application interface 161 can communicate with external system(s) 190 to provide additional functionality for a GM or to augment an external system with GM functionality. As an example, the external systems(s) can include robotic systems, image, video or audio generation/retrieval systems, search engines and booking systems amongst others. In some implementations, the external system(s) 190 are first-party system(s), whereas in other implementations, the external system(s) 190 are third-party system(s). As used herein, the term "first-party" refers to an entity that develops and/or maintains the generative content system 120, whereas the term "third-party" or "third-party entity" refers to an entity that is distinct from the entity that develops and/or maintains the generative content system 120. The internal application interface 162 can communicate with other internal systems and applications stored on the same device as the generative content system 120. These internal systems and applications can provide a GM with additional functionality.

It will be appreciated that some of the sub-engines illustrated in FIG. 1 can be combined and/or omitted in various implementations. Accordingly, it should be understood that the various engines and sub-engines of the generative content system 120 illustrated in FIG. 1 are depicted for the sake of describing certain functionalities and is not meant to be limiting.

Further, the generative content system 120 illustrated in FIG. 1 can interface with various databases, such as training instance(s) database 130A and GM(s) database 140A as described above, and schema(s) database 144A. Although particular engines and/or sub-engines are depicted as having access to particular databases, it should be understood that is for the sake of example and is not meant to be limiting. For instance, in some implementations, each of the various engines and/or sub-engines of the generative content system 120 may have access to each of the various databases. In some implementations, one or more of the databases may be wholly or partially comprised in the client device 110 and/or generative content system 120. Further, some of these databases can be combined and/or omitted in various implementations. Accordingly, it should be understood that the various databases interfacing with the generative content system 120 illustrated in FIG. 1 are depicted for the sake of describing certain data that is accessible to the generative content system 120 and is not meant to be limiting.

As described in more detail herein (e.g., with respect to FIGS. 2, 3A-C and 4), the generative content system 120 can be utilized to generate GUIs for visually rendering GM responses and to dynamically update schemas that are associated with the GUI elements and GM responses based upon user interactions.

Turning now to FIG. 2, an example process flow 200 of interacting with a GM (e.g., stored in GM(s) database 140A) using various components from FIG. 1 is depicted.

The user input engine 111 of a client device 110 receives a user input 201. The user input 201 is, in some examples, received in the form of an input text query. The user input 201 can, for example, originate as text input manually by a user of the user client device 110. Alternatively, or additionally, the user input 201 can originate from a spoken input to the client device 110. The spoken input is converted to the user input 201 by a speech-to-text engine running on the client device 110 or the generative content system 120. The user input 201 is, in some examples, part of an ongoing human-computer dialogue, e.g., a sequence of input queries and their corresponding responses from the generative content system 120.

The user input 201 can be an initial user prompt, for example. The initial user prompt can specify a particular task that the user wishes to perform with the aid of a GM. As an example, the GM can interface with an external system such as a robotic system to enable a user to control the robotic system and the initial user prompt can specify a particular task that the user wishes the robotic system to perform. As another example, the GM can interface with an external system such as a wireless network to enable a user to configure the wireless network and the initial user prompt can specify a particular task that the user wishes the wireless network to perform. In such an example, the user may wish to set up a secure Wi-Fi network. In this case, the user input 201 can be a prompt asking the GM "How can I make my Wi-Fi network secure?".

The user input 201 is received by GM input engine 141 of the generative content system 120. In some implementations, the generative content system 120 is remote from the client device 110 and the user input 201 is transmitted from the client device 110 to the generative content system 120 over network 199. In other implementations, the generative content system 120 resides on the client device 110 and the user input 201 can be retrieved from a memory or storage of the client device 110.

The GM input engine 141 further receives a general schema prompt 220. The general schema prompt 220 may be obtained by the GM input engine 141 from any connected memory or database that may store the general schema prompt 220, such as the schema(s) database 144A, for example. The general schema prompt 220 is a prompt configured to, when processed using the GM, guide the GM to provide its GM output(s) 204 in a particular schema (i.e., the general schema included in the general schema prompt 220). The schema is a structured format in which the GM may provide information responsive to the user input 201. The general schema prompt 220 may include one or more examples of the desired structured format the GM output 204 should take. For example, the general schema prompt 220 may include one or more example schemas, and optionally corresponding examples of the user inputs processed to generate the example schema(s).

In some examples, one or more of the schemas described herein may be in a JSON (JavaScript Object Notation) format, however such an example is not meant to be limiting and it should be understood that in other examples one or more of the schemas described herein may be in a different structured format to a JSON format. The general schema prompt 220 may be selected from a plurality of predetermined general schema prompts based on the user input. In some examples, the general schema prompt 220 may be selected from the plurality of predetermined general schema prompts based on processing the user input 201 using at least one of a classifier or a generative model. By selecting the general schema prompt 220 from a plurality of predetermined general schema prompts based on the user input, a general schema prompt 220 may be selected that has a greater likelihood of causing the GM to provide its GM output(s) 204 in a suitable schema for responding to the user input 201.

The GM input engine 141 can process the user input 201 and the general schema prompt 220 (and optionally context 202 determined by the context engine 113 of the client device 110) to generate a generative model input 203 based upon the user input 201 and the general schema prompt 220. For example, GM input engine 141 can carry out any pre-processing of the user input 201 and/or the general schema prompt 220 such that the inputs can be processed appropriately by a GM. This can include operations such as tokenization and text encoding for example. Notably, in generating the GM input(s) 203, the GM input engine 141 can utilize an explicitation GM (e.g., stored in the GM(s) database 140A). The explicitation GM can be one form of a GM that processes the user input 201 and the general schema prompt 220 (and optionally context 202 determined by the context engine 113 of the client device 110) to generate the GM input(s) 203. The GM input(s) 203 can then be provided to the GM processing engine 142 to generate GM output(s) 204. Put another way, the GM input engine 141 can utilize the explicitation GM to process the raw user input 201 and put it in a structured form that is more suitable for processing by the GM processing engine 142. Further, the GM input engine 141 can utilize the explicitation GM to incorporate the general schema prompt 220 and optionally the context 202 into the GM input(s) 203, and optionally any other dynamic prompts to aid the GM processing engine 142 in generating the GM output(s) 204. For example, and based on the user input 201 being "How can I make my Wi-Fi network secure?", the context 202 can include information about the types of Wi-Fi router(s) present in the Wi-Fi network (e.g., with the information obtained via a call to one of the external system(s) 190), an indication of the capabilities of the user (e.g., an indication that the user is highly proficient in computer networking), and/or other context. Further, and based on the user input 201 being "How can I make my Wi-Fi network secure?", a dynamic prompt can include, for instance, "Generate tasks for making a Wi-Fi network secure, wherein the network is located in a domestic house and the user is highly proficient at computer networking". As another example, based on a user input 201 being "Generate tasks for the robot to clean the room", a dynamic prompt can include, for instance, "Generate tasks for the robot to clean the room, wherein the room is a large kitchen, the robot can self-navigate around the room, and the robot has two arms for grasping".

The GM processing engine 142 processes the generative model input 203 using the GM stored in the GM(s) database

140A to generate a generative model output(s) 204. Moreover, the GM output(s) 204 may include probability distributions over sequences of tokens. For example, in determining GUI elements 205, as described later, the GM GUI generation engine 143 can employ various decoding techniques to determine the GUI elements 205 from a sequence of words or word units (e.g., text-based output) or from a sequence of phonemes or phonetic units (e.g., audio-based output) and based on the probability distribution over the sequence of words or word units or over the sequence of phonemes or phonetic units.

The GM output 204 comprises a set of items that are each responsive to the user input 201. In addition, the presence of the general schema prompt 220 in the GM input 203 has caused the GM to provide, in its GM output 204, the set of items in accordance with a specific schema 230. In some example instances, the specific schema 230 may comprise, for each item in the set of items, a plurality of attributes and at least one corresponding value for each attribute. The same plurality of attributes can be defined for each item in the set of items, however the corresponding value(s) for each attribute may vary between the items. For example, based on the user input 201 being "How can I make my Wi-Fi network secure?", the schema may include a first item of "Enable Wired Equivalent Privacy (WEP)" and a second item of "Enable Wi-Fi Protected Access (WPA)", and a third item of "Enable WPA2". The schema may also define two attributes for each item. For example, a first attribute for each item may be "Description" and a second attribute for each item may be "Date of introduction". The schema also defines, for each item, a corresponding value for each attribute. For example, for the first attribute for the first item, a value of "WEP is a security algorithm" may be provided. For the second attribute of the first item, a value of "1997" may be provided. For the first attribute for the second item, a value of "WPA is a security standard for computing devices with wireless internet connections" may be provided. For the second attribute of the second item, a value of "2003" may be provided. For the first attribute for the third item, a value of "WPA2 is an encrypted security protocol that protects internet traffic" may be provided. For the second attribute of the third item, a value of "2004" may be provided. These items, attributes and values are provided by way of example and are not meant to be limiting. For example, in some instances, different types of items, attributes and/or values may be provided. Alternatively, or additionally, in some instances, the number of items may be smaller or greater than three, and/or the number of attributes and values per item may be smaller or greater than two.

The GM GUI generation engine 143 can generate a set of GUI elements 205 based on the GM output(s) 204, for visually rendering the set of items at the client device 110. The set of GUI elements 205 are generated based on the specific schema 230 included in the GM output 204 (e.g., based on the set of items, the attributes and the values included in the specific schema 230). The GM can be instructed to select or generate an appropriate set of GUI elements 205 for the set of items based on the specific schema 230 determined from the GM output 204. A corresponding GUI element may be generated for each item in the set of items included in the specific schema 230. The GUI elements 205 can be transmitted to the client device 110 and rendered by the rendering engine 112. The GUI elements 205 can include tiles having an appropriate text caption that is representative of the item corresponding to the particular GUI element. For example, based on the user input 201 of "How can I make my Wi-Fi network secure?" discussed above, a first GUI element of the GUI elements 205 may be a first tile having a text caption "Enable Wired Equivalent Privacy (WEP)" corresponding to the first item of the specific schema 230, a second GUI element of the GUI elements 205 may be a second tile having a text caption "Enable Wi-Fi Protected Access (WPA)" corresponding to the second item of the specific schema 230, and a third GUI element of the GUI elements 205 may be a third tile having a text caption "Enable WPA2" corresponding to the third item of the specific schema 230.

In some examples, the GUI elements 205 (e.g., tiles) may each include the attribute(s) and corresponding value(s) associated with the item corresponding to that particular GUI element. For example, in addition to the text caption "Enable Wired Equivalent Privacy (WEP)", the first tile may also include the first attribute and corresponding value for the first item and the second attribute and corresponding value for the first item (e.g., the first tile may include a text caption of "Description: WEP is a security algorithm" and a text caption of "Date of introduction: 1997". Similarly, in addition to the text caption "Enable Wi-Fi Protected Access (WPA)", the second tile may also include a text caption of "Description: WPA is a security standard for computing devices with wireless internet connections" and a text caption of "Date of introduction: 2003". Furthermore, in addition to the text caption "Enable Wi-Fi Protected Access (WPA)", the third tile may also include a text caption of "Description: WPA2 is an encrypted security protocol that protects internet traffic" and a text caption of "Date of introduction: 2004".

One or more of the GUI elements 205 (e.g., one or more of the tiles) can also include a representative thumbnail image which can be generated by the GM, generated by the visual multimedia content engine 150, or obtained from an external system by the GM, for example.

Subsequent to determining the specific schema 230 based on the GM output 204, the GM GUI generation engine 143 can store the specific schema 230 in the schema(s) database 144A, the specific schema 230 including the items, attributes and values discussed previously. Storing the specific schema 230 allows it to be retrieved by the generative content system 120 at a later point in time and utilized for further processing using the GM.

The GM GUI generation engine 143 can also determine, based on the GM output 204, a specific schema prompt 240. The specific schema prompt 240 is specific to the user input 201 and is based on the general schema prompt 220. The specific schema prompt 240 is based on the specific schema 230. In some examples, the specific schema prompt 240 comprises the specific schema 230, including the set of items, attributes and values. The specific schema prompt 240 may be stored in the schema(s) database 144A, for example. The specific schema prompt 240 is a prompt configured to, when processed using the GM, guide the GM to provide an additional GM output(s) 214 in a particular schema format (i.e., the format of the specific schema included in the specific schema prompt 240, or a modified version thereof).

Subsequent to receiving the user input 201 (e.g., after causing the GUI elements 205 to be rendered at the client device 110), the user input engine 111 of the client device 110 can receive an additional user input 211. The additional user input 211 is, in some examples, received in the form of an additional input text query. The additional user input 211 can, for example, originate as text input manually by the user of the user client device 110. Alternatively, or additionally, the additional user input 211 can originate from a spoken input to the client device 110. The spoken input is converted to the additional user input 211 by a speech-to-text engine running on the client device 110 or the generative content system 120.

The additional user input 211 can be a follow-up user prompt, for example. In some examples, the additional user input 211 comprises one or more constraints provided by the user. As an example, based on the user input 201 of "How can I make my Wi-Fi network secure?" discussed above, an example of an additional user input 211 may be "I want the network to be very secure".

The GM input engine 141 can process the additional user input 201 and the specific schema prompt 240 (e.g., received from the schema(s) database 144A), optionally with context 202 determined by the context engine 113 of the client device 110, to generate an additional generative model input 213. The additional generative model input 213 is based upon the additional user input 211 and the specific schema prompt 240. For example, GM input engine 141 can carry out any pre-processing of the additional user input 211 and/or the specific schema prompt 240 such that the inputs can be processed appropriately by the GM (e.g., as described previously in relation to the user input 201 and general schema prompt 220).

The GM processing engine 142 processes the additional GM input 213 using the GM stored in the GM(s) database 140A to generate an additional generative model output(s) 214. Incorporating the specific schema prompt 240 into the additional GM input 213 (including the specific schema 230) can allow the specific schema 230 to be taken into account by the GM when processing the additional user input 211 to produce the additional GM output 214. As such, the GM may be guided to provide the additional GM output 214 in the same, or a similar, structured format as the specific schema 230. Further, items, attributes and values included in the specific schema 230 may be carried through to the additional GM output 214. As such, the use of a specific schema prompt 240 may assist with state preservation when using the GM.

The additional GM output 214 comprises a set of items that are each responsive to the user input 201. In addition, the presence of the specific schema prompt 240 in the GM input 203 has guided the GM to provide, in its GM output 214, the set of items in an updated specific schema 250 which may be substantially similar to the specific schema 230. For example, the updated specific schema 250 may be identical to the specific schema 230, however the updated specific schema 250 may include an additional attribute and corresponding value for each item in the set of items, the additional attribute based on the additional user input 211. For example, based on the additional user input 211 being "I want the network to be very secure", the updated specific schema 250 may be similar or identical to previous specific schema 230, however it may now include a new additional attribute of "Security" for each item, and a corresponding value for the attribute for each item. In such an example, the updated specific schema 250 may include a value of "Low" for the additional attribute of "Security" for the first item, a value of "Medium" for the additional attribute of "Security" for the second item, and a value of "High" for the additional attribute of "Security" for the third item, for example. The GM will have been guided by the additional user input 211 and the specific schema prompt 240 in the additional GM input 213 to provide the additional attribute in the updated specific schema 250. That is, the GM may have determined based on the additional GM input 213 that the additional attribute (and corresponding values) may be helpful in providing an output that is responsive to the user input 201 and additional user input 213. In some examples, more than one additional attribute (and corresponding value) may be added for each item. Additionally or alternatively, the updated specific schema 250 may include one or more additional items (with corresponding attribute(s) and value(s)) that are in addition to the set of items included in the specific schema 230.

The GM GUI generation engine 143 can generate a set of updated GUI elements 215 based on the additional GM output(s) 214, for visually rendering the set of items included in the updated specific schema 250 at the client device 110. The GM can be instructed to select or generate an appropriate set of updated GUI elements 215 for the set of items based on the updated specific schema 250. The updated GUI elements 215 can be transmitted to the client device 110 and rendered by the rendering engine 112. The updated GUI elements 215 can include tiles, optionally including text captions corresponding to the attributes and values as previously described in relation to the GUI elements 205. The GM GUI generation engine 143 may store the updated specific schema 250 and/or an updated specific schema prompt (not shown) at the schema(s) database 144A for later use by the generative content system 120. The updated specific schema prompt may include the updated specific schema 250 and may be used as part of a future input to the GM (e.g., in a similar manner to the use of the specific schema prompt 240 as part of the additional GM input 213).

Figure 3A:
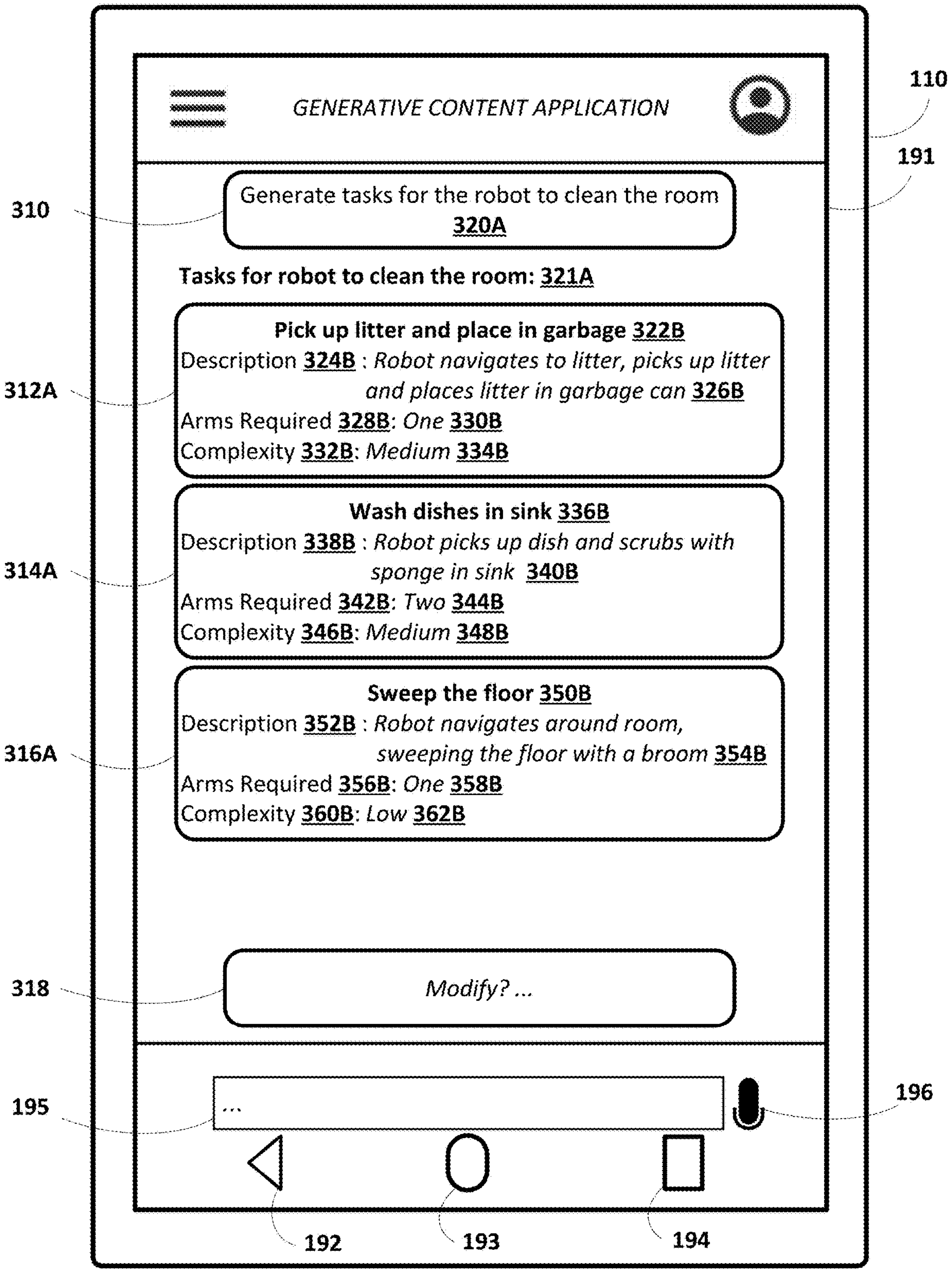
FIG. 3A, FIG. 3B and FIG. 3C depict various non-limiting example GUIs, in accordance with various implementations.
Figure 3B:
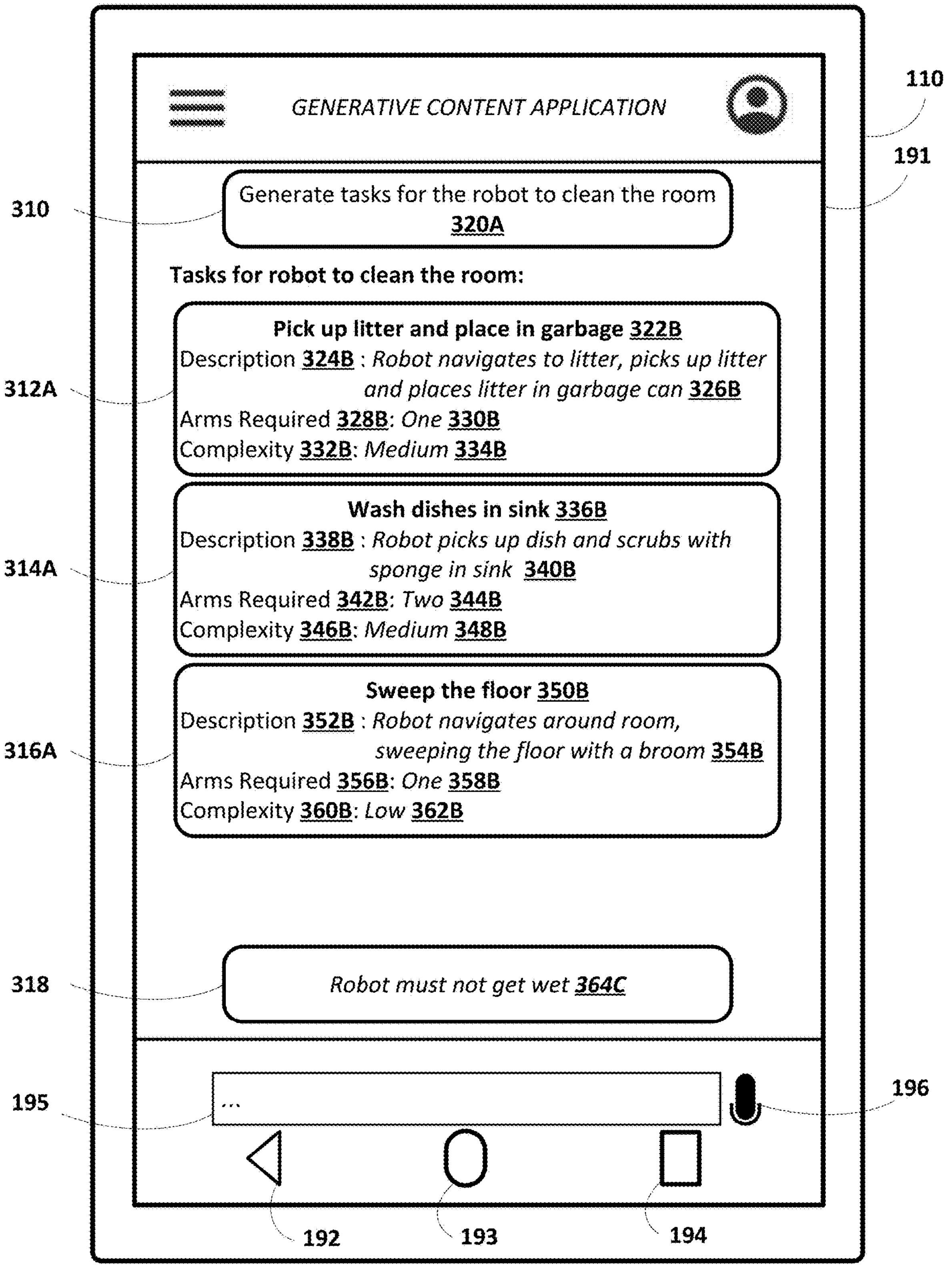
Figure 3C:
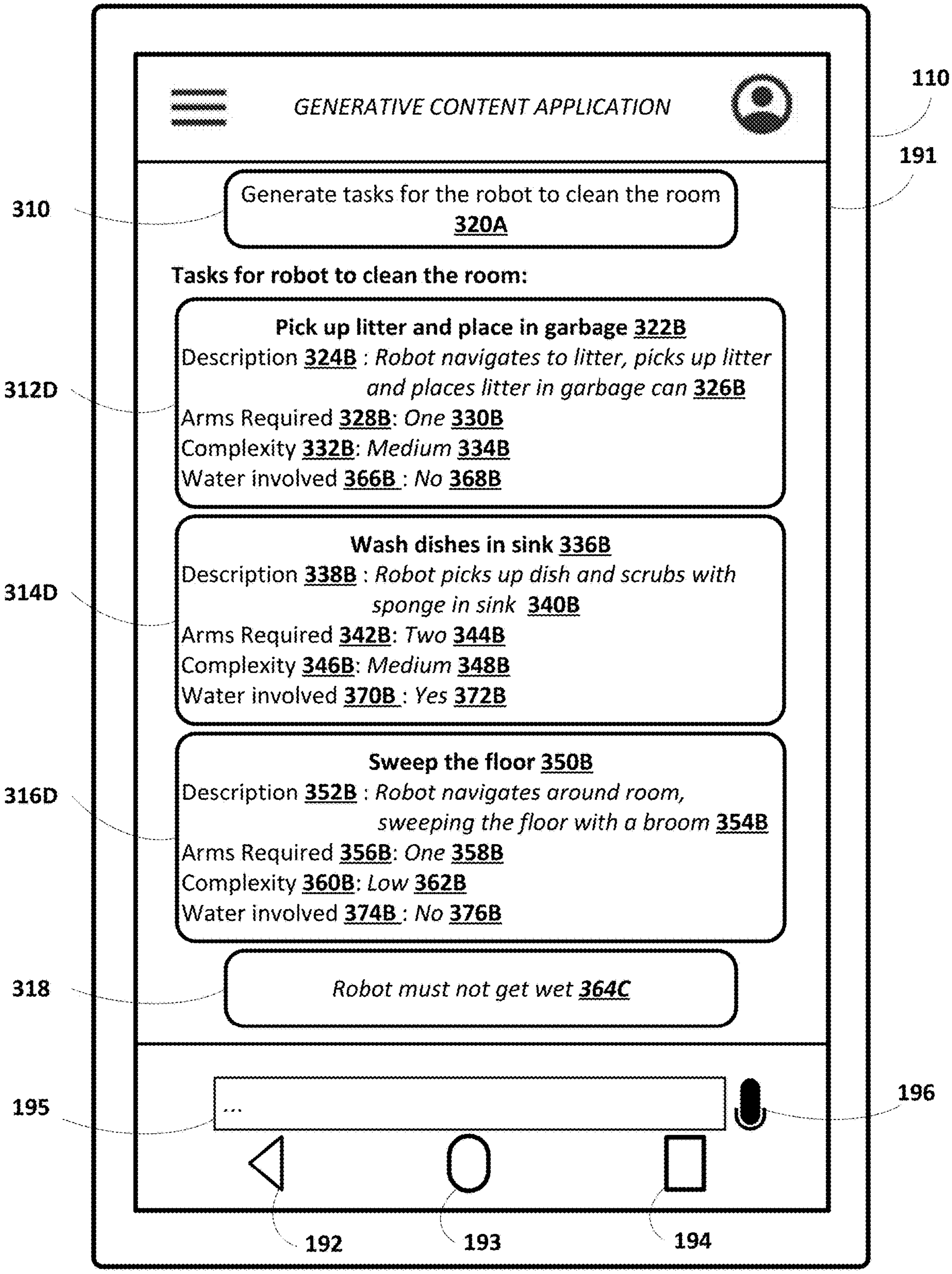

Turning now to FIGS. 3A, 3B and 3C, various non-limiting examples of generating GUI elements are depicted. A client device 110 (e.g., the client device 110 from FIG. 1) may include various user interface components including, for example, microphone(s) to generate audio data based on spoken utterances and/or other audible input, speaker(s) to audibly render synthesized speech and/or other audible output, and/or a display 191 to visually render visual output. Further, the display 191 of the client device 110 can include various system interface elements 192, 193, and 194 (e.g., hardware and/or software interface elements) that may be interacted with by a user of the client device 110 to cause the client device 110 to perform one or more actions. The display 191 of the client device 110 enables the user to interact with content rendered on the display 191 by touch input (e.g., by directing user input to the display 191 or portions thereof (e.g., to a text entry box 195, to a keyboard (not depicted), or to other portions of the display 191)) and/or by spoken input (e.g., by selecting microphone interface element 196—or just by speaking without necessarily selecting the microphone interface element 196 (i.e., an automated assistant may monitor for one or more terms or phrases, gesture(s) gaze(s), mouth movement(s), lip movement(s), and/or other conditions to activate spoken input) at the client device 110). Although the client device 110 depicted in FIGS. 3A, 3B and 3C is a mobile phone, it should be understood that is for the sake of example and is not meant to be limiting. For example, the client device 110 may be a standalone speaker with a display, a standalone speaker without a display, a home automation device, an in-vehicle system, a laptop, a desktop computer, and/or any other device capable of executing an automated assistant to engage in a human-to-computer dialog session with the user of the client device 110.

Referring specifically to FIG. 3A, assume that a user of the client device 110 accesses a generative content application, via the client device 110, that enables the user to interact with a generative content system (e.g., the generative content system 120 of FIG. 1). Further assume that the user wishes to control a robot that interfaces with the generative content system and therefore provides user input of "Generate tasks for the robot to clean the room", as indicated at 320A. FIG. 3A shows the user input indicated in a rendered GUI element 310, however it should be understood that this is not meant to be limiting and that in some examples the user input is indicated in a different manner (e.g., audibly rendered), or is not indicated. In response to receiving the user input, the generative content system can generate a plurality of GUI elements (e.g., as described with respect to FIG. 1, FIG. 2, and/or the method 400 of FIG. 4). In the example shown in FIG. 3A, the generative content system has generated a first GUI element 312A, a second GUI element 314A and a third GUI element 316A. However, it should be understood that this number of GUI elements is non-limiting and that in other examples, fewer or more than three GUI elements may be generated. Each of the GUI elements has been rendered as a tile, however it should be understood that in other examples the GUI elements may be rendered in a different manner. In some examples, the GUI elements (e.g., tiles) may be rendered in a grid layout.

The first GUI element 312A includes a text caption of "Pick up litter and place in garbage" representative of a corresponding first item responsive to the user input 320A, as indicated at 322B. The first item is of a set of items included in a specific schema output by a GM in a GM output in response to processing a GM input, the GM input including the user input and a general schema prompt (e.g., as described in relation to FIG. 2 and/or the method 400 of FIG. 4). The first GUI element 312A also includes a plurality of attributes and, for each attribute, at least one corresponding value, the attributes and values included in the specific schema. FIG. 3A shows the first GUI element 312A including a first attribute of "Description" as indicated at 324B and a first value of "Robot navigates to litter, picks up litter and places litter in garbage can" corresponding to the first attribute and indicated at 326B. FIG. 3A shows the first GUI element 312A also including a second attribute of "Arms Required" as indicated at 328B and a second value of "One" corresponding to the second attribute and indicated at 330B. FIG. 3A shows the first GUI element 312A also including a third attribute of "Complexity" as indicated at 332B and a third value of "Medium" corresponding to the second attribute and indicated at 334B.

The second GUI element 314A includes a text caption of "Wash dishes in sink" representative of a corresponding second item responsive to the user input 320A, as indicated at 336B. The second item is of the set of items included in the specific schema. The second GUI element 314A also includes a plurality of attributes that are the same as the plurality of attributes previously described in relation to the first GUI element 312A and, for each attribute, at least one corresponding value, the attributes and values included in the specific schema. FIG. 3A shows the second GUI element 314A including the first attribute of "Description" as indicated at 338B and a corresponding first value of "Robot picks up dish and scrubs with sponge in sink" as indicated at 340B. FIG. 3A shows the second GUI element 314A also including the second attribute of "Arms Required" as indicated at 342B and a corresponding second value of "Two" as indicated at 344B. FIG. 3A shows the second GUI element 314A also including the third attribute of "Complexity" as indicated at 346B and a corresponding third value of "Medium" as indicated at 348B.

The third GUI element 316A includes a text caption of "Sweep the floor" representative of a corresponding third item responsive to the user input 320A, as indicated at 350B. The third item is of the set of items included in the specific schema. The third GUI element 316A also includes a plurality of attributes that are the same as the plurality of attributes previously described in relation to the first GUI element 312A and the second GUI element 314A and, for each attribute, at least one corresponding value, the attributes and values included in the specific schema. FIG. 3A shows the third GUI element 316A including the first attribute of "Description" as indicated at 352B and a corresponding first value of "Robot navigates around room, sweeping the floor with a broom" as indicated at 354B. FIG. 3A shows the third GUI element 316A also including the second attribute of "Arms Required" as indicated at 356B and a corresponding second value of "One" as indicated at 358B. FIG. 3A shows the third GUI element 316A also including the third attribute of "Complexity" as indicated at 360B and a corresponding third value of "Low" as indicated at 362B.

The generative content system 120 can determine a text heading based on the GM output and responsive to the user input 320A, and render the text heading as indicated at 321A. Additionally or alternatively, the generative content system 120 can cause a text input box 318 to be rendered at the display 191, the text input box 318 usable by the user of the client device 110 to provide additional user input.

Referring specifically to FIG. 3B, and continuing with the example from FIG. 3A, further assume that the user provides additional user input as indicated at 364C of "Robot must not get wet" via the text input box 318. Notably, in the example of FIG. 3C, the additional user input 364C provides a constraint that the robot must not get wet, wherein this constraint is to be taken into consideration by the GM.

Figure 4:
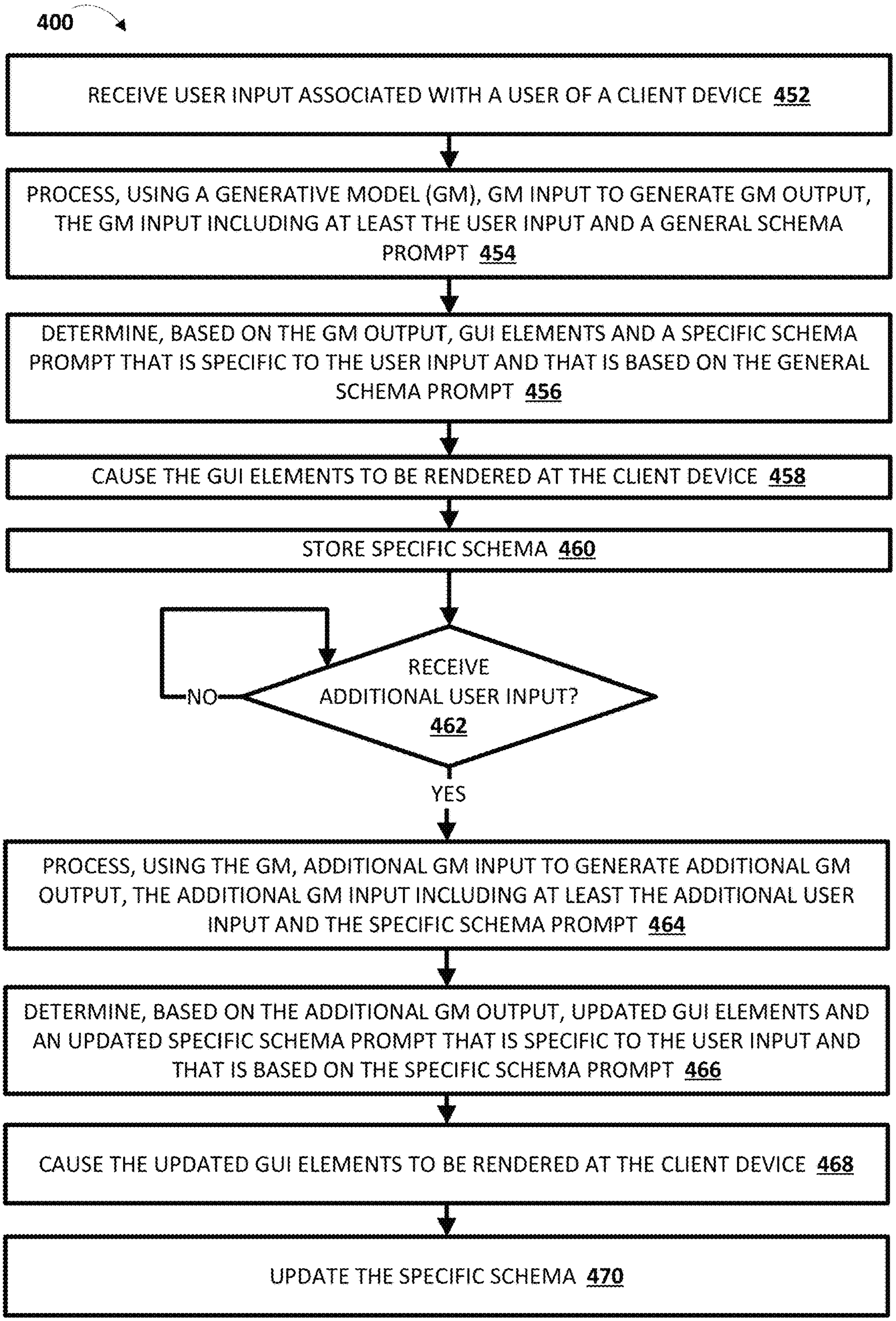
FIG. 4 depicts a flowchart illustrating an example method of providing a GUI for generative models, in accordance with various implementations.

Referring specifically to FIG. 3C, and continuing with the example from FIGS. 3A and 3B, in response to receiving the additional user input 364C, the generative content system can process, using the generative model, an additional generative model input to generate an additional generative model output, the additional generative model input including at least the additional user input and a specific schema prompt, the specific schema prompt including or otherwise being based on the specific schema used to generate the GUI elements, (e.g., as described with respect to FIG. 1, FIG. 2, and/or the method 400 of FIG. 4). The generative content system can generate a plurality of updated GUI elements based on the additional generative model output (e.g., as described with respect to FIG. 1, FIG. 2, and/or the method 400 of FIG. 4). In the example shown in FIG. 3C, the generative content system has generated a first updated GUI element 312D, the second updated GUI element 314D and the third updated GUI element 316D and rendered the updated GUI elements at the client device 110. In this example, the first updated GUI element 312D, a second updated GUI element 314D and a third updated GUI element 316D are identical to the first GUI element 312A, second GUI element 314A and third GUI element 316A respectively, except that an additional attribute of "Water involved" and a corresponding value for that additional attribute has been added to each GUI element. The additional attribute has been determined by the GM based on the additional user input 364C. FIG. 3C shows the first updated GUI element 312D including the additional attribute "Water involved" as indicated at 366B and corresponding value "No" as indicated at 368B, the second updated GUI element 314D including the additional attribute "Water involved" as indicated at 370B and corresponding value "Yes" as indicated at 372B, and the third updated GUI element 316D including the additional attribute "Water involved" as indicated at 374B and a corresponding value "No" as indicated at 376B. The additional user input 364C has been used by the GM to update the previous specific schema provided to the GM as input with the new additional attribute of "Water involved" and corresponding values for each item in the specific schema as part of an updated specific schema, thereby providing the user with additional pertinent information that can be rendered as part of the updated GUI elements and that may assist the user with determining which updated GUI element is most responsive to the user input and updated user input.

In some examples, the generative content system may filter the updated GUI elements based on the additional attribute (e.g., based on the values corresponding to the additional attribute). For example, the generative content system can determine, based on the value associated with the additional attribute for each item, whether the item satisfies the additional user input 364C. In some examples, updated GUI elements corresponding to items that satisfy the additional user input 364C may be rendered while updated GUI elements corresponding to items that do not satisfy the additional user input 364C may not be rendered. In other examples, updated GUI elements corresponding to items that satisfy the additional user input 364C may be rendered with different formatting to those updated GUI elements corresponding to items that do not satisfy the additional user input 364C.

Although FIGS. 3A-3C are described with respect to particular examples, it should be understood that those examples are provided to illustrate techniques contemplated herein and are not meant to be limiting.

In some implementations, the generative content system 120 can communicate at least a portion of the specific schema and/or updated specific schema to an external robotic system to cause the robot to perform a task corresponding to one of the generated items (e.g., to cause the robot to "Sweep the floor").

It will be appreciated that, through the use of schema and schema prompts, the generative content system enables the preservation of GM outputs when interacting with the GM.

It will be appreciated that the above example of a robot and the GUI shown in FIGS. 3A-C is not intended to be limiting. The system can be used in connection with any other appropriate task. For example, other tasks can include allocation of resources on a computing system, e.g., the allocation of jobs to processing nodes with constraints based upon processor, memory and/or storage requirements of each job. Other tasks can include the control of manufacturing processes for manufacturing a mechanical, chemical, biological or food product, including any intermediate elements. These can be constrained by the consumption of resources such as electricity, water, raw materials and other consumables in the manufacturing process. Other tasks can include the control or maintenance of equipment in service facilities, such as a data center, including temperature controls, air flow and air conditioning for example.

The system can also be used to help users with more general tasks, for example, to help a user with planning a vacation or a birthday party. The system can interface with external systems to enable the user to view options and to book a table for a restaurant at a particular location, or to see what movies are showing at a theatre and to book tickets, or to view options for tourist attractions, or to view options and book appropriate transportation as examples. The system can also be used for other tasks such as to help a user with learning an instrument, or to help a user with a college application amongst others.

The GM can have any appropriate architecture. For example, the GM can include one or more Transformer blocks and can have an encoder/decoder, encoder-only or decoder-only architecture.

A GM can be trained on large amounts of data including data from, but not limited to, webpages, electronic books, software code, electronic news articles, and machine translation data. Unsupervised or self-supervised learning can be used for training. For example, a next token prediction task and/or a masked token prediction task can be used. In some implementations, the GM can be trained on uni-modal data and multi-modal data. For multi-modal training, the GM can be trained using corresponding image and text pairs. For example, these can be obtained from alt-text for images on webpages. Next token prediction and masked token prediction can also be used for multi-modal training. For example, the task can involve prediction of a caption for a particular image. Other tasks can include a matching task, for example, determining whether a particular text caption matches a particular image or vice versa. Similar training can be carried out for other modalities.

A GM may undergo further training to improve the GM's ability to respond to user prompts and queries. For example, supervised fine-tuning (SFT) and/or reinforcement learning with human feedback (RLHF) can be used. In SFT, a high-quality dataset including examples of input prompts and corresponding responses (which may be multi-modal) can be used. This data is typically generated by human annotators, though this data can be augmented by using the models themselves to generate further examples using human annotated data as seeds. The GM can be trained using supervised learning to generate the corresponding responses from the input prompt. In RLHF, a reward model can be trained from human preference data regarding different outputs generated from the same input prompt and reinforcement learning used to update the parameters of the GM based upon the reward values provided by the trained reward model.

A GM can be fine-tuned to carry out the above-described GM GUI interaction techniques using any appropriate training technique such as SFT and RLHF. In some implementations, fine-tuning of a GM is not required and a GM can be instructed with appropriate prompts to generate the required output. The prompts can include one or more examples (or descriptions of examples) that the GM should output to provide guidance for the GM.

Turning now to FIG. 4, a flowchart illustrating an example method 400 of interacting with a GM using a GUI with dynamic schema adjustment is shown. For convenience, the operations of the method 400 are described with reference to a system that performs the operations. This system of the method 400 includes one or more processors, memory, and/or other component(s) of computing device(s) (e.g., client device 110 of FIG. 1, generative content system 120 of FIG. 1, computing device 510 of FIG. 5, one or more servers, and/or other computing devices). Moreover, while operations of the method 400 are shown in a particular order, this is not meant to be limiting. One or more operations may be reordered, omitted, and/or added.

At block 452, the system receives user input associated with a user of a client device (e.g., as described in relation to FIG. 1, FIG. 2 and/or FIGS. 3A-3C). For example, the user input can be an initial user prompt. The initial user prompt can specify a particular task that the user wishes to perform with the aid of a GM.

At block 454, the system processes, using a generative model, a generative model input to generate a generative model output (e.g., as described in relation to FIG. 1, FIG. 2 and/or FIGS. 3A-3C). The generative model input includes at least the user input and a general schema prompt. The system may have selected the general schema prompt from a plurality of predetermined general schema prompts based on the user input. The generative model output is usable to determine a plurality of GUI elements, each GUI element corresponding to an item that is responsive to the user input.

At block 456, the system determines, based on the generative model output, the GUI elements and a specific schema prompt that is specific to the user input and that is based on the general schema prompt (e.g., as described in relation to FIG. 1, FIG. 2 and/or FIGS. 3A-3C).

At block 458, the system causes the GUI elements to be rendered at the client device (e.g., as described in relation to FIG. 1, FIG. 2 and/or FIGS. 3A-3C). In some implementations, the GUI elements can include selectable tiles or buttons having an appropriate text caption that is representative of the item or the associated prompt. The GUI elements can also include a representative thumbnail image which can be generated by the GM or obtained from an external system for example.

At block 460, the system stores a specific schema (e.g., as described in relation to FIG. 1, FIG. 2 and/or FIGS. 3A-3C), for example in a schema(s) database (e.g., schema(s) database 144A). The specific schema is determined from the GM output. The specific schema may be used to determine the specific schema prompt (e.g., the specific schema prompt may include the specific schema). In some examples, the system stores the specific schema prompt, for example in a schema(s) database (e.g., schema(s) database 144A).

At block 462, the system determines whether additional user input has been received (e.g., as described in relation to FIG. 1, FIG. 2 and/or FIGS. 3A-3C). The additional user input can be associated with the user of the client device. The additional user input can be received via typed input, spoken input, touch input, etc. If, at an iteration of block 462, the system determines that no additional user input has been received, then the system can continue monitoring for additional user input at block 462. If, at an iteration of block 462, the system determines that additional user input has been received, then the system proceeds to block 464.

At block 464, the system processes, using the generative model, the additional generative model input to generate an additional generative model output (e.g., as described in relation to FIG. 1, FIG. 2 and/or FIGS. 3A-3C). The additional generative model input includes at least the additional user input and the specific schema prompt.

At block 466, the system determines, based on the additional generative model output, updated GUI elements and an updated specific schema prompt that is specific to the user input and that is based on the specific schema prompt (e.g., as described in relation to FIG. 1, FIG. 2 and/or FIGS. 3A-3C). An updated specific schema is determined from the GM output. The updated specific schema may be used to determine the specific schema prompt (e.g., the updated specific schema prompt may include the updated specific schema).

At block 468, the system causes the updated GUI elements to be rendered at the client device (e.g., as described in relation to FIG. 1, FIG. 2 and/or FIGS. 3A-3C).

At block 470, the system updates the specific schema that was previously stored at block 460 (e.g., as described in relation to FIG. 1, FIG. 2 and/or FIGS. 3A-3C). For example, the system may update the specific schema by modifying the specific scheme stored in the schema(s) database 144A or overwriting the specific schema stored in the schema(s) database 144A. In some examples, the system stores the updated specific schema prompt, for example in a schema(s) database (e.g., schema(s) database 144A).

In some examples, the method 400 terminates at block 470. However, in other examples, steps 462-470 may be repeated in response to receipt of a further user input. In such examples, and responsive to the system receiving a further user input associated with the user of the client device (e.g., in a similar manner as previously described in relation to the additional user input), the system may process, using the generative model, a further generative model input to generate a further generative model output, the further generative model input including at least the further user input and the updated specific schema prompt previously provided at block 470. Subsequently, the system determines, based on the further generative model output, further updated GUI elements and a further updated specific schema prompt that is specific to the user input and that is based on the updated specific schema prompt (e.g., in a similar manner as described in relation to block 456 and/or block 466). The system then causes the further updated GUI elements to be rendered at the client device (e.g., in a similar manner as described in relation to block 458 and/or block 468). Subsequently, the system updates the (updated) specific schema that is stored (e.g., in a similar manner as described in relation to block 458 and/or block 468), to provide a further updated specific schema.

In some examples, the system determines, based on the generative model output, a further prompt associated with the user input and causes a selectable GUI element corresponding to the further prompt to be rendered at the client device. For example, the selectable GUI element may comprise text corresponding to the further prompt. In such examples, receiving the additional user input associated with the user of the client device comprises detecting user selection of the selectable GUI element, and the additional generative model input comprises the further prompt. In such examples, the system has pre-emptively generated a further prompt which may be selected by the user for use as the additional user input, in lieu of the user providing their own additional user input e.g., via a text input box.

Figure 5:
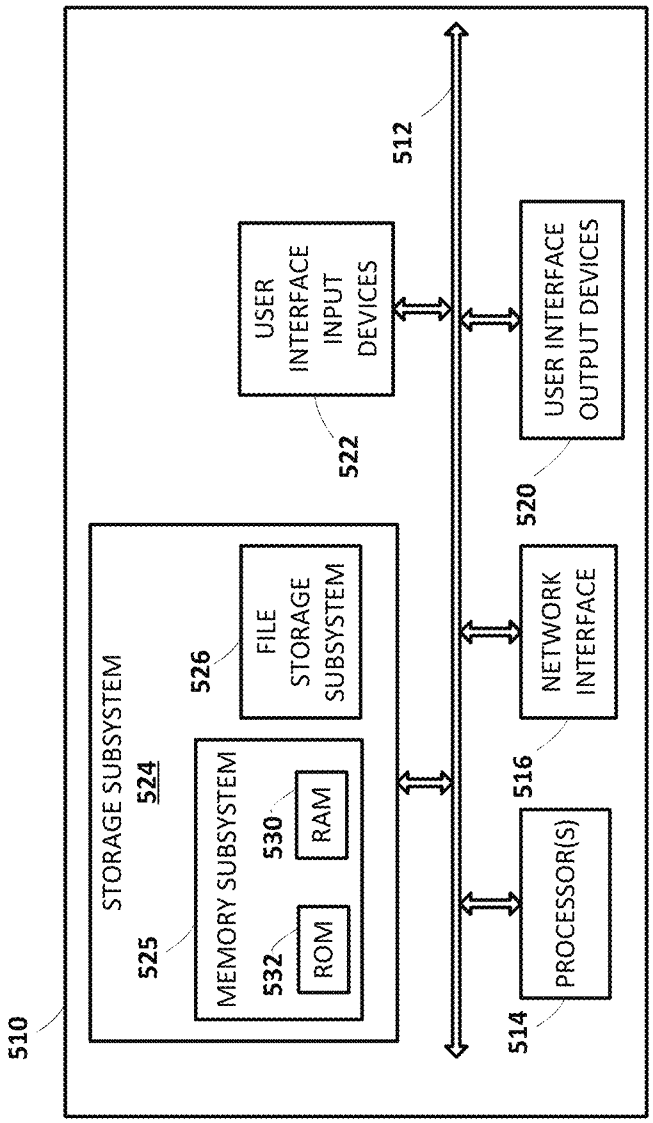
FIG. 5 depicts an example architecture of a computing device, in accordance with various implementations.

Turning now to FIG. 5, a block diagram of an example computing device 510 that may optionally be utilized to perform one or more aspects of techniques described herein is depicted. In some implementations, one or more of a client device, generative content system component(s) or other cloud-based software application component(s), and/or other component(s) may comprise one or more components of the example computing device 510.

Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of the methods disclosed herein, as well as to implement various components depicted in FIGS. 1 and 2.

These software modules are generally executed by processor 514 alone or in combination with other processors. Memory 525 used in the storage subsystem 524 can include a number of memories including a main random-access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem 512 may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, and includes: receiving user input associated with a user of a client device; processing, using a generative model, a generative model input to generate a generative model output, the generative model input including at least the user input and a general schema prompt; determining, based on the generative model output, GUI elements and a specific schema prompt that is specific to the user input and that is based on the general schema prompt; causing the GUI elements to be rendered at the client device; storing a specific schema that has been determined based on the generative model output; receiving additional user input associated with the user of the client device; processing, using the generative model, an additional generative model input to generate an additional generative model output, the additional generative model input including at least the additional user input and the specific schema prompt; determining, based on the additional generative model output, updated GUI elements and an updated specific schema prompt that is specific to the user input and that is based on the specific schema prompt; causing the updated GUI elements to be rendered at the client device; and updating the specific schema that is stored.

These and other implementations of technology disclosed herein can optionally include one or more of the following features.

In some implementations, the method may further include receiving further user input associated with the user of the client device; processing, using the generative model, a further generative model input to generate a further generative model output, the further generative model input including at least the further user input and the updated specific schema prompt; determining, based on the further generative model output, further updated GUI elements and a further updated specific schema prompt that is specific to the user input and that is based on the updated specific schema prompt; causing the further updated GUI elements to be rendered at the client device; and updating the specific schema that is stored.

In some additional or alternative implementations, the additional user input may be received via at least one of typed input, spoken input or touch input provided at the client device.

In some additional or alternative implementations, the method may further include determining, based on the generative model output, a further prompt associated with the user input; and causing a selectable GUI element corresponding to the further prompt to be rendered at the client device. Receiving additional user input associated with the user of the client device may include detecting user selection of the selectable GUI element, and wherein the additional generative model input comprises the further prompt.

In some additional or alternative implementations, the general schema prompt may be selected from a plurality of predetermined general schema prompts based on the user input.

In some versions of those implementations, the general schema prompt may be selected based on processing the user input using at least one of a classifier or a generative model.

In some additional or alternative implementations, at least one of the specific schema or the updated specific schema may be in a JSON format.

In some additional or alternative implementations, the specific schema may be determined based on the generative model output and may define a set of items responsive to the user input, at least one attribute for each item of the set of items, and a corresponding value for each attribute.

In some versions of those implementations, the updated schema may include the specific schema, an additional attribute for each item of the set of items, and a corresponding value for the additional attribute for each item of the set of items, the additional attribute based on the additional user input.

In some versions of those implementations, the method may further include filtering the updated GUI elements based on the additional attribute.

In some additional or alternative implementations, each GUI element may correspond to a respective item of the set of items.

In some versions of those implementations, each GUI element may include a corresponding thumbnail image representative of the respective item.

In additional or alternative versions of those implementations, each GUI element may include a text caption representative of the respective item.

In some additional or alternative implementations, the additional user input may include one or more constraints provided by the user.

In some additional or alternative implementations, each GUI element of the GUI elements may include a corresponding tile.

In some additional or alternative implementations, the GUI elements may be arranged in a grid layout.

In some additional or alternative implementations, the generative model may be a large language model.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the aforementioned methods. For example, the instructions may be configured to cause performance of a method comprising: receiving user input associated with a user of a client device; processing, using a generative model, a generative model input to generate a generative model output, the generative model input including at least the user input and a general schema prompt; determining, based on the generative model output, GUI elements and a specific schema prompt that is specific to the user input and that is based on the general schema prompt; causing the GUI elements to be rendered at the client device; storing a specific schema that has been determined based on the generative model output; receiving additional user input associated with the user of the client device; processing, using the generative model, an additional generative model input to generate an additional generative model output, the additional generative model input including at least the additional user input and the specific schema prompt; determining, based on the additional generative model output, updated GUI elements and an updated specific schema prompt that is specific to the user input and that is based on the specific schema prompt; causing the updated GUI elements to be rendered at the client device; and updating the specific schema that is stored.

Some implementations also include one or more computer readable storage media (e.g., transitory and/or non-transitory) storing computer instructions executable by one or more processors to perform any of the aforementioned methods. Some implementations also include a computer program product including instructions executable by one or more processors to perform any of the aforementioned methods.

What is claimed is:

1. A method implemented by one or more processors, the method comprising:

receiving user input associated with a user of a client device;

processing, using a generative model, a generative model input to generate a generative model output, the generative model input including at least the user input and a general schema prompt;

determining, based on the generative model output, GUI elements and a specific schema prompt that is specific to the user input and that is based on the general schema prompt;

causing the GUI elements to be rendered at the client device;

storing a specific schema that has been determined based on the generative model output;

receiving additional user input associated with the user of the client device;

processing, using the generative model, an additional generative model input to generate an additional generative model output, the additional generative model input including at least the additional user input and the specific schema prompt;

determining, based on the additional generative model output, updated GUI elements and an updated specific schema prompt that is specific to the user input and that is based on the specific schema prompt;

causing the updated GUI elements to be rendered at the client device; and updating the specific schema that is stored.

2. The method of claim 1, further comprising:

receiving further user input associated with the user of the client device;

processing, using the generative model, a further generative model input to generate a further generative model output, the further generative model input including at least the further user input and the updated specific schema prompt;

determining, based on the further generative model output, further updated GUI elements and a further updated specific schema prompt that is specific to the user input and that is based on the updated specific schema prompt;

causing the further updated GUI elements to be rendered at the client device; and updating the specific schema that is stored.

3. The method of claim 1, wherein the additional user input is received via at least one of typed input, spoken input or touch input provided at the client device.

4. The method of claim 1, further comprising:

determining, based on the generative model output, a further prompt associated with the user input; and causing a selectable GUI element corresponding to the further prompt to be rendered at the client device, wherein receiving additional user input associated with the user of the client device comprises detecting user selection of the selectable GUI element, and wherein the additional generative model input comprises the further prompt.

5. The method of claim 1, wherein the general schema prompt is selected from a plurality of predetermined general schema prompts based on the user input.

6. The method of claim 5, wherein the general schema prompt is selected based on processing the user input using at least one of a classifier or a generative model.

7. The method of claim 1, wherein at least one of the specific schema or the updated specific schema is in a JSON format.

8. The method of claim 1, wherein the specific schema is determined based on the generative model output and defines a set of items responsive to the user input, at least one attribute for each item of the set of items, and a corresponding value for each attribute.

9. The method of claim 8, wherein the updated specific schema comprises the specific schema, an additional attribute for each item of the set of items, and a corresponding value for the additional attribute for each item of the set of items, the additional attribute based on the additional user input.

10. The method of claim 9, further comprising filtering the updated GUI elements based on the additional attribute.

11. The method of claim 8, wherein each GUI element corresponds to a respective item of the set of items.

12. The method of claim 11, wherein each GUI element comprises a corresponding thumbnail image representative of the respective item.

13. The method of claim 11, wherein each GUI element includes a text caption representative of the respective item.

14. The method of claim 1, wherein the additional user input comprises one or more constraints provided by the user.

15. The method of claim 1, wherein each GUI element of the GUI elements comprises a corresponding tile.

16. The method of claim 1, wherein the GUI elements are arranged in a grid layout.

17. The method of claim 1, wherein the generative model comprises a large language model.

18. A system comprising:
one or more processors; and
a memory storing computer readable instructions that, when executed by the one or more processors, causes the one or more processors to perform a method comprising:
receiving user input associated with a user of a client device;
processing, using a generative model, a generative model input to generate a generative model output, the generative model input including at least the user input and a general schema prompt;
determining, based on the generative model output, GUI elements and a specific schema prompt that is specific to the user input and that is based on the general schema prompt;
causing the GUI elements to be rendered at the client device;
storing a specific schema that has been determined based on the generative model output;
receiving additional user input associated with the user of the client device;
processing, using the generative model, an additional generative model input to generate an additional generative model output, the additional generative model input including at least the additional user input and the specific schema prompt;
determining, based on the additional generative model output, updated GUI elements and an updated specific schema prompt that is specific to the user input and that is based on the specific schema prompt;
causing the updated GUI elements to be rendered at the client device; and
updating the specific schema that is stored.

19. A non-transitory computer-readable storage medium storing instructions that, when executed by one or more processors, cause the one or more processors to:
receive user input associated with a user of a client device;
process, using a generative model, a generative model input to generate a generative model output, the generative model input including at least the user input and a general schema prompt;
determine, based on the generative model output, GUI elements and a specific schema prompt that is specific to the user input and that is based on the general schema prompt;
cause the GUI elements to be rendered at the client device;
store a specific schema that has been determined based on the generative model output;
receive additional user input associated with the user of the client device;
process, using the generative model, an additional generative model input to generate an additional generative model output, the additional generative model input including at least the additional user input and the specific schema prompt;
determine, based on the additional generative model output, updated GUI elements and an updated specific schema prompt that is specific to the user input and that is based on the specific schema prompt;
cause the updated GUI elements to be rendered at the client device; and
update the specific schema that is stored.

* * * * *